United States Patent
Wentzler

(10) Patent No.: US 9,251,983 B2
(45) Date of Patent: Feb. 2, 2016

(54) DEPTH-ACTIVATED SENSOR SWITCH AND METHOD

(71) Applicant: SERCEL, INC., Houston, TX (US)

(72) Inventor: Paul Wentzler, Houston, TX (US)

(73) Assignee: SERCEL INC., Houston, TX (US)

( * ) Notice: Subject to any disclaimer, the term of this patent is extended or adjusted under 35 U.S.C. 154(b) by 470 days.

(21) Appl. No.: 13/866,161

(22) Filed: Apr. 19, 2013

(65) Prior Publication Data

US 2014/0312713 A1    Oct. 23, 2014

(51) Int. Cl.
*G01V 1/38*  (2006.01)
*H01H 35/32*  (2006.01)
*G01V 1/20*  (2006.01)

(52) U.S. Cl.
CPC ............... *H01H 35/32* (2013.01); *G01V 1/201* (2013.01); *G01V 1/38* (2013.01); *Y10T 307/779* (2015.04)

(58) Field of Classification Search
USPC ................................. 307/118; 367/15, 20, 25
See application file for complete search history.

(56) References Cited

U.S. PATENT DOCUMENTS

| 4,455,500 | A | 6/1984 | Savit et al. |
| 6,049,511 | A * | 4/2000 | Erath .................. H04R 23/008 367/149 |
| 6,318,497 | B1 | 11/2001 | De Groot et al. |
| 7,612,886 | B2 * | 11/2009 | Guerineau et al. ..... G01V 1/181 356/477 |

* cited by examiner

*Primary Examiner* — Danny Nguyen
(74) *Attorney, Agent, or Firm* — Patent Portfolio Builders PLLC

(57) ABSTRACT

A switch for a marine seismic sensor. The switch includes a bellows having a closed end, a side portion and an open end, wherein the side portion connects the closed end to the open end, the closed end includes a conductive surface, and the side portion acts as a spring; a base plug that includes first input and first output contacts on a first side and second input and second output contacts on an opposite side; and a plug located in the open end of the bellows and configured to form a chamber, inside which the second input contact and the second output contact are provided. The conductive surface short-circuits the second input contact and the second output contact when a pressure larger than a predetermined pressure (P) acts on the conductive surface.

25 Claims, 11 Drawing Sheets

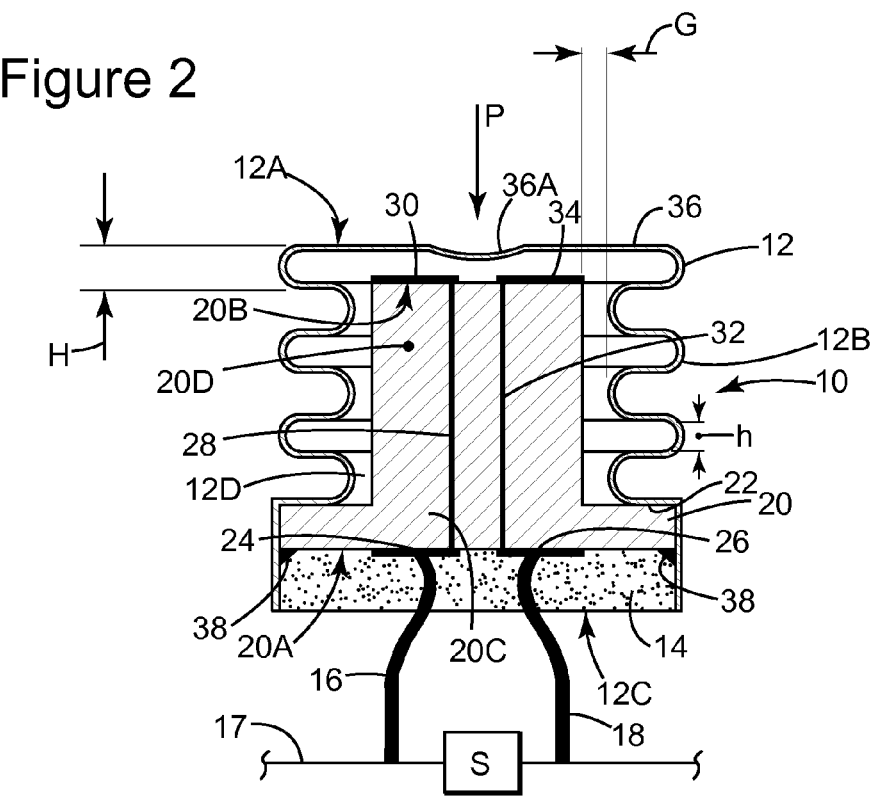
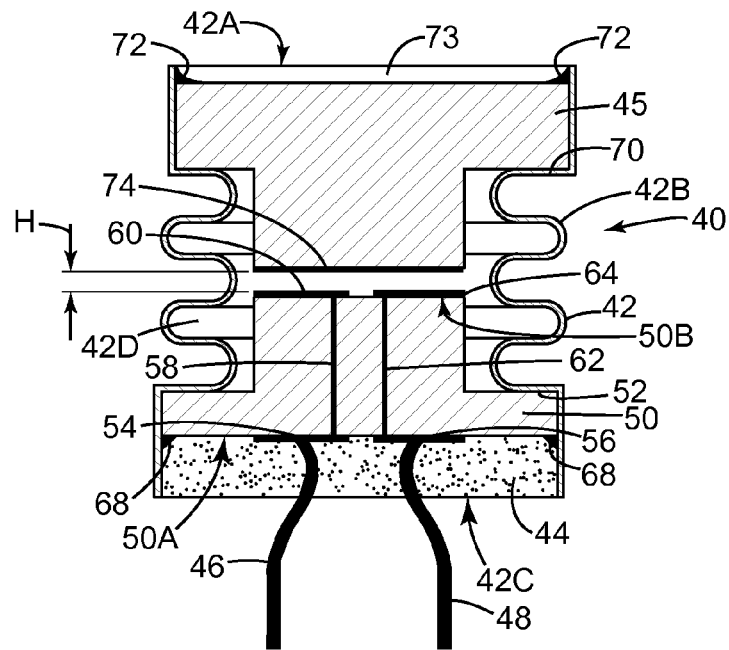

DEPTH-ACTIVATED SENSOR SWITCH AND METHOD

BACKGROUND

1. Technical Field

Embodiments of the subject matter disclosed herein generally relate to methods and systems and, more particularly, to mechanisms and techniques for automatically switching off seismic equipment used for marine geophysical exploration when a given depth is exceeded.

2. Discussion of the Background

Reflection seismology is a method of geophysical exploration to determine the properties of a portion of a subsurface layer in the earth, which information is especially helpful in the oil and gas industry. Marine reflection seismology is based on the use of a controlled seismic source that sends energy waves into the earth. By measuring the time it takes for the reflections to come back to plural receivers, it is possible to estimate the depth and/or composition of the features causing such reflections. These features may be associated with subterranean hydrocarbon deposits.

For marine applications, a seismic source is towed by a vessel at a certain depth along direction X as illustrated in FIG. 1. The acoustic waves from the seismic source (air gun, water gun, vibratory source, etc.) propagate in all directions. FIG. 1 shows a source array 104 being towed behind a vessel 101 at a shallow depth. The source array 104 may be connected to a float 102 for floating at a given depth and also to the vessel 101 by an umbilical 111 for receiving, for example, electrical signals and/or compressed air. When the source array is activated, acoustic energy is coupled into the water and transmitted into the earth, where part of the energy is partially reflected back from the ocean bottom 113 and from rock formation interfaces 112 (rock layer that has a change in acoustic impedance). Sensors or receivers 106, located along a streamer 105, are used to record the reflected energy. Such receivers may include hydrophones, geophones and/or accelerometers. The receivers can be encapsulated in either fluid-filled or solid streamers 105 that are also towed by vessels at shallow depth.

Currently, it is typical for one vessel to tow multiple streamers with diverters employed to ensure streamer separation by a fixed distance. In order to maintain the proper spacing between the streamers and sources, the vessel moves forward continuously, typically at a rate of about 4 knots (2 m/s). In some cases, the positions of the streamers can be controlled so that all receivers are at a common depth, or in other cases the receivers in each streamer are controlled to follow a particular depth profile.

Modern streamers are equipped with birds, compasses and GPS receiver buoys. Birds are devices equipped with wings or fins, and the birds are spaced at intervals and are in communication with the vessel to control streamer depth and transverse spatial position. Alternatively, the receivers can be stationary and positioned on the ocean floor as autonomous nodes or in an ocean bottom cable.

Depending upon the sensor type, the returning energy is recorded as a pressure, velocity or acceleration variation as a function of time at each receiver position. Combining recordings made at multiple source and receiver locations can be used to form an image of the subterranean features of the earth. Images formed from reflection seismology are useful for locating structures that are indicative of oil and/or gas reservoirs.

However, the above-noted technology may be used not only for determining an image of the subsurface, but also objects present in the water, e.g., whales, dolphins, submarines, etc. Because of this dual use of the seismic acquisition systems, and in order to prevent commercial seismic systems to be used in the military field, there are national and international regulations requiring that each hydrophone be provided with a pressure-sensitive switch that switches off the hydrophone if it achieves a depth greater than 35 m.

Effective design of such a pressure-sensitive switch to meet these requirements has not been easy. It is desirable that such a switch be inexpensive, particularly because seismic survey operations today use a number of streamers, each of which may have hundreds of hydrophones that must each have a depth-limiting device. The pressure at which the switch closes cannot deviate substantially from the desired depth setting, because the hydrophones operate in large arrays, and the premature disabling of some of the hydrophones can degrade the array's performance or even require suspension of a survey, at great expense.

De Groot et al., in U.S. Pat. No. 6,318,497, the entire content of which is incorporated herein by reference, discloses a pressure-sensitive switch including a base member having a mounting surface formed of electrically-insulating material. Two electrodes are mounted on the base member, with each electrode having an electrically-conductive contact surface. A flexible, corrugated diaphragm has its periphery secured in a fluid-tight manner to the mounting surface with its electrically-conductive central portion overlying the contact surfaces of the electrodes. The plural corrugations are exposed to the external pressure. When the switch is exposed to atmospheric pressure, the central portion of the diaphragm does not touch the contact surfaces of said electrodes, but when the switch is exposed to a pressure greater than the atmospheric pressure, this central portion is forced into contact with both contact surfaces, thus electrically connecting the two electrodes.

The switch disclosed by De Groot et al. has certain drawbacks. The corrugated diaphragm is unnecessarily complex, requiring a high degree of exacting quality control, which increases the cost of the entire unit. Also, the corrugated diaphragm must be very carefully set. Furthermore, slight variations in the configuration of the corrugated diaphragm result in the failure of the electrically-conductive elements of the switch to make contact.

Thus, there remains a need for a simple, inexpensive, lightweight, pressure-sensitive switch for mounting in a hydrophone cable, and other applications, which eliminates the corrugated diaphragm. The present depth-limiting switch is directed to filling these and other needs in the art.

SUMMARY

According to one embodiment, there is a switch for a marine seismic sensor. The switch includes a bellows having a closed end, a closed side portion and an open end, wherein the side portion connects the closed end to the open end, the closed end includes a conductive surface, and the side portion acts as a spring; a base plug that includes first input and first output contacts on a first side and second input and second output contacts on an opposite side, wherein the first input contact is electrically connected to the second input contact through a first jumper and the first output contact is electrically connected to the second output contact through a second jumper; and a plug located in the open end of the bellows and configured to form a chamber inside which the second input contact and the second output contact are located, wherein the chamber is formed by the bellows and the base plug. The conductive surface short-circuits the second input contact and the second output contact when a pressure larger than a predetermined pressure (P) acts on the conductive surface.

According to another embodiment, there is a switch for a marine seismic sensor and the switch includes a bellows having a first open end, a side portion and a second open end, wherein the side portion connects the first open end to the second open end, and the side portion acts as a spring; a base plug located in the second open end and includes first input and first output contacts on a first side and second input and second output contacts on an opposite second side, wherein the first input contact is electrically connected to the second input contact through a first jumper and the first output contact is electrically connected to the second output contact through a second jumper; an end plug located in the first open end of the bellows and configured to include an electrode facing the second input contact and the second output contact; and a plug located in the open end of the bellows and configured to form a chamber with the bellows and the base plug, and the second input contact and the second output contact are located inside the chamber. The electrode short-circuits the second input contact and the second output contact when a pressure larger than a predetermined pressure (P) acts on the end plug.

According to still another embodiment, there is a switch for a marine seismic sensor that includes a metal cap having a spring region connecting a top surface to a body having an opening, wherein the spring region has a diameter larger than a diameter of the body; and a plug located inside the metal cap to close the opening and configured to host plural contacts. When a pressure is applied on the top surface, the spring region deforms to allow the top surface to move towards the plug, and when a predetermined pressure (P) is applied on the top surface, the spring region deforms to allow the top surface to contact two of the plural contacts.

According to another embodiment, there is a method for switching off a seismic sensor during a marine seismic survey. The method includes towing the seismic sensor at a predetermined water depth that is smaller than a threshold water depth; recording seismic data with the seismic sensor; and automatically switching off the seismic sensor with a switch located proximal to the seismic sensor, under water, when a current depth of the seismic sensor is larger than the threshold water depth. The switch has a bellows and a conductive portion and the conductive portion is calibrated to touch two contact pads to switch off the seismic sensor when water pressure acts on the bellow at a depth larger than the threshold water depth.

BRIEF DESCRIPTION OF THE DRAWINGS

The accompanying drawings, which are incorporated in and constitute a part of the specification, illustrate one or more embodiments and, together with the description, explain these embodiments. In the drawings:

FIG. 2 is a schematic diagram of a switch according to an exemplary embodiment;

FIG. 3 is a schematic diagram of a switch according to another exemplary embodiment;

DETAILED DESCRIPTION

Figure 1:
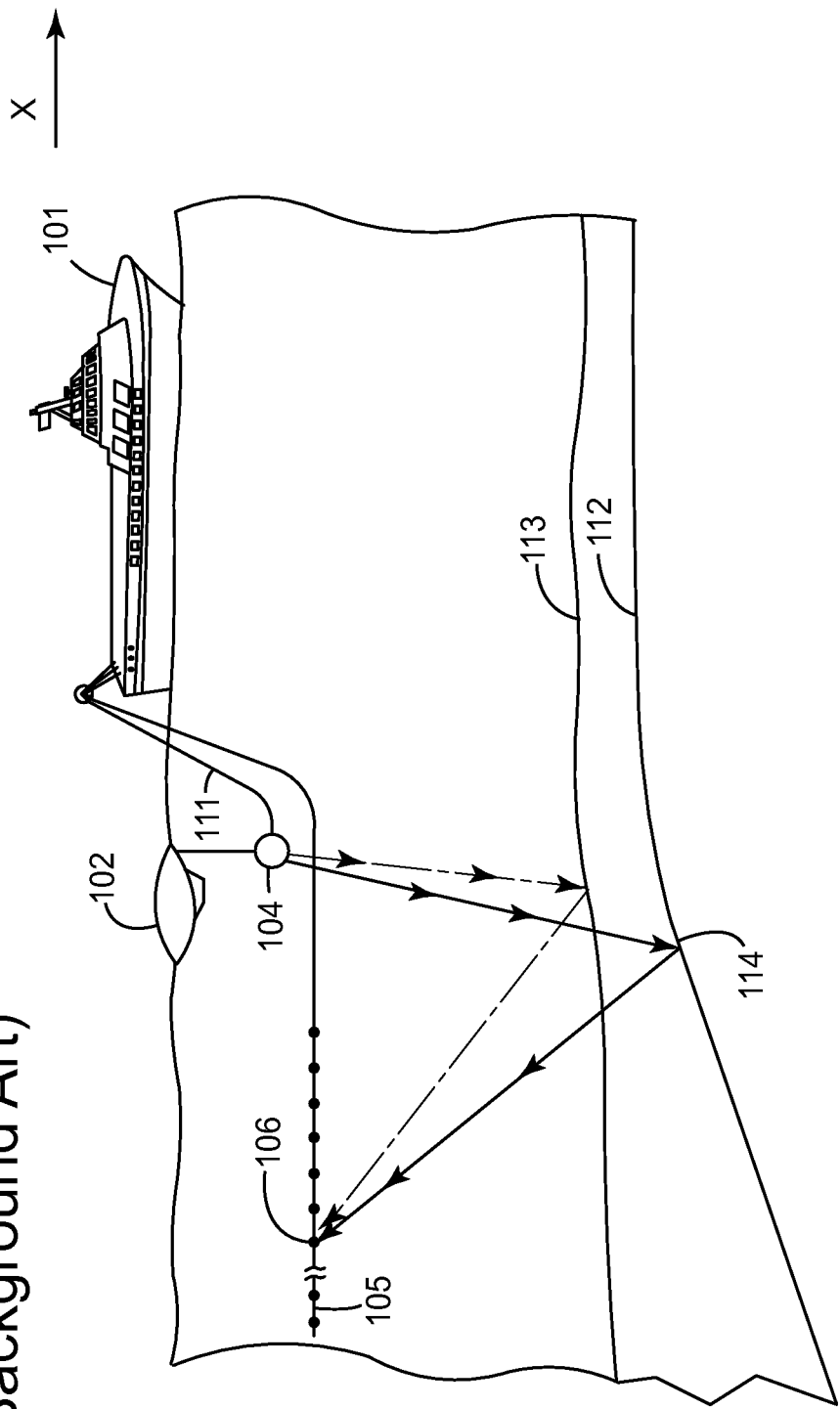
FIG. 1 illustrates a traditional marine seismic survey system.

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to a switch attached to a hydrophone and activated by pressure. However, the switches to be discussed next are not limited to a seismic environment, but may be applied to other structures that must be switched off automatically at a certain pressure.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures, or characteristics may be combined in any suitable manner in one or more embodiments.

According to an exemplary embodiment illustrated in FIG. 2, a pressure-sensitive switch 10 may include a bellows element 12 having a closed end 12A and an open end 12C sealed with a seal plug 14. A side portion 12B connects the closed end 12A to the open end 12C. The side portion 12B may be manufactured to have one or more undulations as illustrated on FIG. 2. The side portion 12B of the bellows 12 may provide a precise spring rate so that the pressure at which the switch carries out its intended function can be well-predicted. The seal plug may be penetrated by an input signal lead 16 and by an output signal lead 18. The signal leads 16 and 18 are sealed so that air or other gas cannot enter or escape chamber 12D. The seal plug 14 may be positioned in abutting contact with a base plug 20 to hold the base plug captured in a recess 22 of the bellows element 12. The seal plug may be glued or fixed by other means to sides of the bellows 12. Optionally, the seal plug may be glued or fixed by other means to the bottom part of the base plug.

The base plug 20 may be made of an electrically-insulating material for reasons to be discussed later. In one embodiment, the base plug 20 is a printed circuit board (PCB) that has electrical contacts on opposite faces 20A and 20B. For example, a first input contact pad 24 is positioned between the seal plug 14 and the base plug 20, on face 20A of the base plug, for electrical contact with the input signal lead 16. Similarly, a first output contact pad 26 is positioned between the seal plug and the base plug, on face 20A of the base plug, for electrical contact with the output signal lead 18. The first input contact pad communicates electrically with an input jumper 28 which terminates in a second input contact pad 30 on the face 20B. The first output contact pad 26 communicates electrically with an input jumper 32 which terminates in a second output contact pad 34 also on the face 20B. The two faces 20A and 20B may be opposite each other.

In one embodiment, the area of the face 20A, facing the seal plug 14, is larger than the area of the face 20B. For example, as illustrated in FIG. 2, the base plug 20 may have a T-shape, with the large part 20C facing the seal plug 14. Other shapes of the base plug may be possible. The narrow part 20D of the base plug 20 makes a clearance G with the side portion 12B of the bellows 12. This clearance accommodates the side portion 12B when a pressure P compresses the bellows 12 and the side portions 12B expand due to the compression. A size h of an undulation of the side portion 12B may be selected based on the strength of the material used for the bellows 12 and also on the desired depth at which the switch switches off the corresponding sensor S. Bellows 12 be made of an electrically-conductive material, e.g., a metal or other material. The number of undulations of the side portion 12B may vary, for example, between one and ten.

The top surface 12A of the bellows 12 comprises an electrically-conductive surface 36, which may be substantially flat with a protuberance 36A as illustrated in the figure. The protuberance may be formed to contact the contact pads 30 and 34. In one exemplary embodiment, the conductive surface 36 may be flat with no protuberances (e.g., smooth with no angle changes in its surface). However, as illustrated later, the conductive surface 36 may have, besides a flat portion, dimples, other protuberances, or a non-flat profile to increase contact pressure. When functional, the dimples or other protuberances move integrally with the flat portion, i.e., the dimples or other protuberances cannot move relative to the flat portion as in the case of a corrugated surface. The inside of the bellows 12 and the outside of the base plug 20 form a chamber 12D. As discussed later, the chamber 12D may be hermetically closed, thus, encapsulating, for example, air at a desired pressure. Other gases than air may be used to fill chamber 12D.

When the pressure-sensitive switch 10 is exposed to atmospheric pressure, the bellows 12 is in its relaxed position, and the electrically-conductive surface 36 is not in electrical contact with the second input contact pad 30 and the second output contact pad 34. When the switch 10 is submerged underwater and, therefore, subjected to underwater hydrostatic pressure, the bellows 12 becomes compressed, i.e., the size h of the undulation decreases and the gap H between the surface 36 and the face 20B of the base plug 20 also decreases. When the switch reaches a desired depth (e.g., 35 m), the gap H may become zero, i.e., the electrically-conductive surface 36 contacts the contact pads 30 and 34. In other words, the gap H between the conductive surface 36 and the top side 20B of the base plug is calculated based on a spring constant of the side portion 12B of the bellows 12 so that for a predetermined outside pressure (P), the gap H becomes zero. This action shorts the contact pads 30 and 34, thereby shorting across the seismic sensor S, e.g., hydrophone, which includes a signal line 17. Shorting across the hydrophone S effectively disables the hydrophone for that given depth. However, when the streamer moves above the shorting depth, the switch opens sensor S and, thus, sensor S can be again used for seismic recording. In other words, the short lasts only as long as the external pressure is above the predetermined value.

The switch 10 may be assembled in a hyperbaric chamber set at a predetermined pressure (that may correspond to the pressure exerted by a water column of 35 m). In this way, a selected pressure is captured within the bellows 12, which combined with the bellows spring constant, sets the hydrostatic pressure at which the switch will function to short the hydrophone. As the switch is assembled, a seal bead 38 may be formed around the seal plug 14, sealing in the predetermined pressure. In other words, the chamber 12D is hermetically sealed with the seal bead 38. Thus, the embodiment of FIG. 2 includes, among others, the advantage that the bellows forms a unitary body to hold in the selected pressure, and a single, simple bead effectively seals the entire mechanism. This embodiment also provides the advantage of being able to withstand high overpressure conditions.

FIG. 3 depicts another embodiment of a switch 40. The switch 40 includes a bellows element 42 sealed at one end 42C with a seal plug 44 and at its other end 42A with an end plug 45. As for the device of FIG. 2, the bellows element 42 has a side portion 42B acting as a spring mechanism (e.g., corrugated or undulate portion) that provides a more precise spring rate than existing switches so that the pressure at which the switch carries out its intended function can be well-predicted. The seal plug is penetrated by an input signal lead 46 and by an output signal lead 48. The seal plug 44 is positioned in abutting contact with a base plug 50 to hold the base plug captured in a recess 52 of the bellows element 42. Both the base plug 50 and the end plug 45 may have a T-shape as illustrated in the figure. Of course, other shapes may be implemented as would be appreciated by those skilled in the art. The end plug may be made of any insulator material, while the base plug 50 may be made similar to the base plug 20 illustrated in FIG. 2.

A first input contact pad 54 is positioned at an interface between the seal plug 44 and the base plug 50 (on a lower face 50A of the base plug 50) for electrical contact with the input signal lead 46. Similarly, a first output contact pad 56 is positioned at the interface between the seal plug and the base plug (on an upper face 50B of the base plug 50) for electrical contact with the output signal lead 48. The first input contact pad communicates electrically with an input jumper 58 which terminates in a second input contact pad 60 on a top surface 50B of the base plug 50. The first output contact pad 56 communicates electrically with an input jumper 62 which terminates in a second output contact pad 64 also on the top surface of the base plug 50.

The end plug 45 is sealed within an upper recess 70 of the bellows 42 with a seal bead 72. Optionally, a top plate 73 may be located over the end plug 45. The top plate 73 may be made of a metallic material. An electrode (shorting contact) 74 may be located on the bottom surface of the end plug 45 to face the base plug 50. The electrode 74 may be entirely flat, or may have one or more protuberances to better contact corresponding pads.

When the pressure-sensitive switch 40 is exposed to atmospheric pressure, the bellows 42 is in its relaxed position and the shorting contact 74 is not in electrical contact with the second input contact pad 60 and the second output contact pad 64. However, when the switch 40 is submerged and, therefore, subjected to underwater hydrostatic pressure, the bellows 42 compresses until the shorting contact 74 contacts the contact pads 60 and 64 (i.e., gap H is reduced to zero). This shorts across the contact pads 60 and 64, thereby shorting across the hydrophone (not shown) and disabling it.

The switch 40 is also preferably assembled in a hyperbaric chamber set at a predetermined pressure. This captures a selected pressure within the bellows 42, which automatically sets the hydrostatic pressure at which the switch will function to short the hydrophone. As the switch is assembled, a seal bead 68 is formed around the seal plug, sealing in the predetermined pressure, as well as the seal bead 72. The embodiment of FIG. 3 includes, among others, the advantage that the bellows element of this embodiment is less expensive to produce and provides a more robust contact mating function.

Figure 4A:
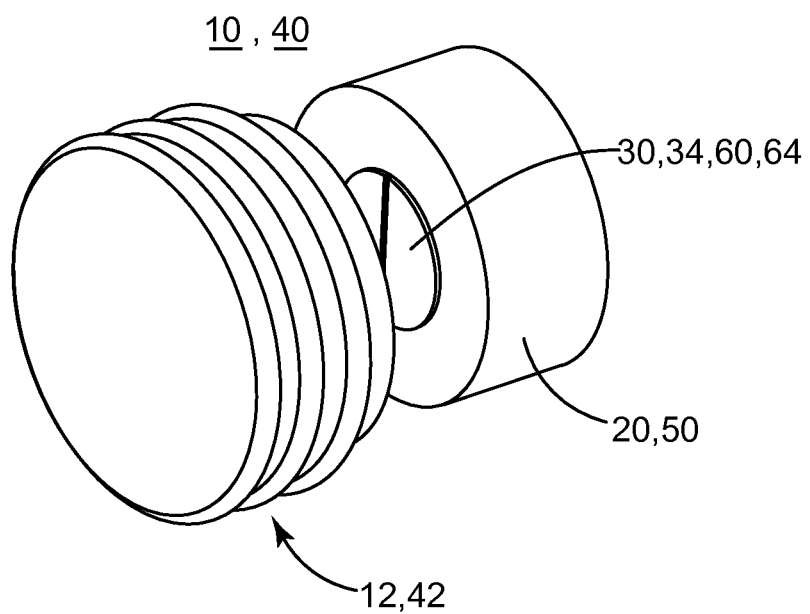
FIG. 4A is an overall view of the switch of FIG. 2 or 3 according to an exemplary embodiment.
Figure 4B:
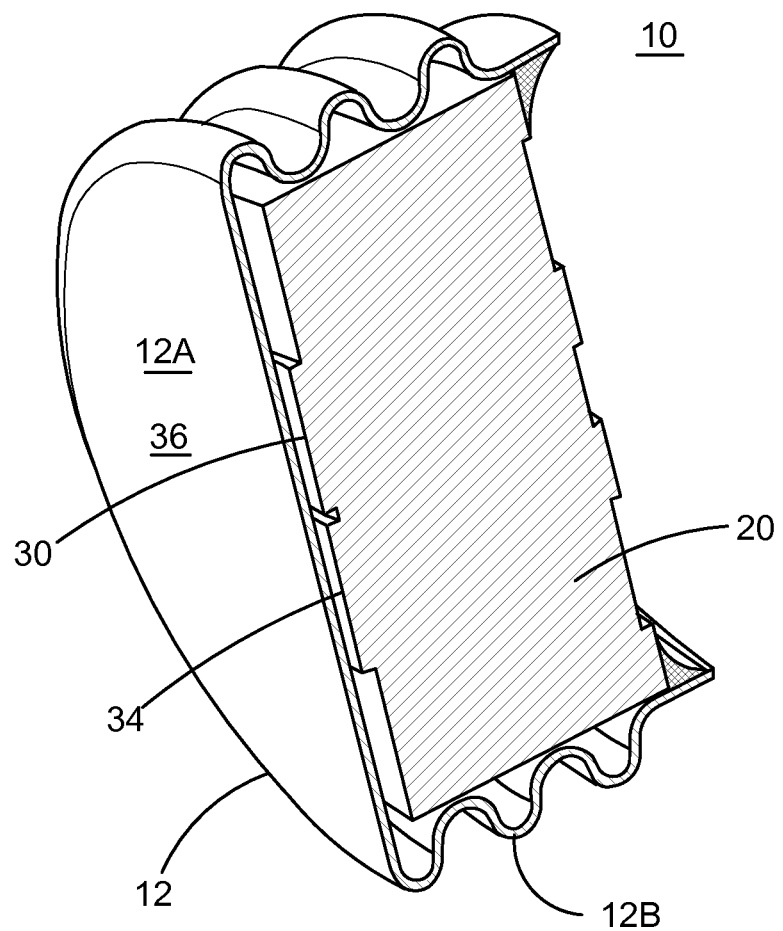
FIG. 4B is a cross-section of the switch of FIG. 2 according to an exemplary embodiment.

An overall view of either the switch 10 or the switch 40 is illustrated in FIG. 4A, which shows the bellows 12, 42 configured to receive the base plug 20, 50. The pads 30, 34, 60, 64 are visible on the upper face of the plug. FIG. 4B shows a cut-through (cross-section) of the switch 10.

Figure 5:
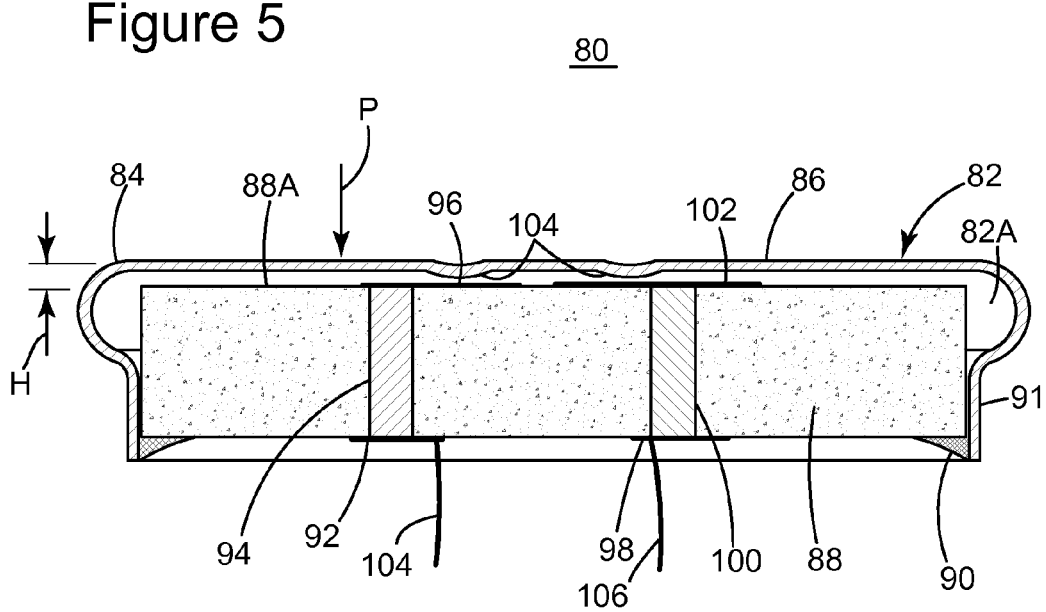
FIG. 5 is a schematic diagram of another switch according to an exemplary embodiment.

FIG. 5 depicts another embodiment of a pressure-sensitive switch 80. The switch comprises a shaped metal cap 82 with a radially outwardly extending bulge 84. The metal cap may be cylindrical, and the bulge (or hump) may extend all around the metal cap. In one application, there is a single bulge or hump. The cap includes a cylindrical body 91 defining a body diameter. Other shapes for the metal cap and body may be imagined, for example, oval, etc. Note that the bulge 84 has a diameter larger than the diameter of the cylindrical body 91. The bulge 84 serves as a spring mechanism supporting a top surface 86 of the cap 82, and the bulge extends radially beyond the body diameter. Under pressure, the top surface 86 is pressed down, and the bulge 84 flexes inward so the top surface 86 moves toward a seal plug 88. The seal plug 88 is positioned within the cap 82 and sealed with a seal bead 90 so that a hermetically closed chamber 82A is formed between the cap 82 and the seal plug 88. A bottom input contact 92 is formed on the bottom of the seal plug 88, and the contact 92 is electrically coupled to an input jumper 94, which connects to an upper input contact 96. Similarly, a bottom output contact 98 is formed on the bottom of the seal plug 88 and connects to an output jumper 100 and then to an upper output contact 102. The upper input and output contacts 96 and 102 are formed on a top surface 88A of the seal plug 88 and face the top surface 86. The contact 92 is connected to an input signal lead 104 and the contact 98 is connected to an output signal lead 106. The signal leads 104 and 106 are connected to a seismic sensor, for example, a hydrophone, similar to the embodiment illustrated in FIG. 2.

Figure 6:
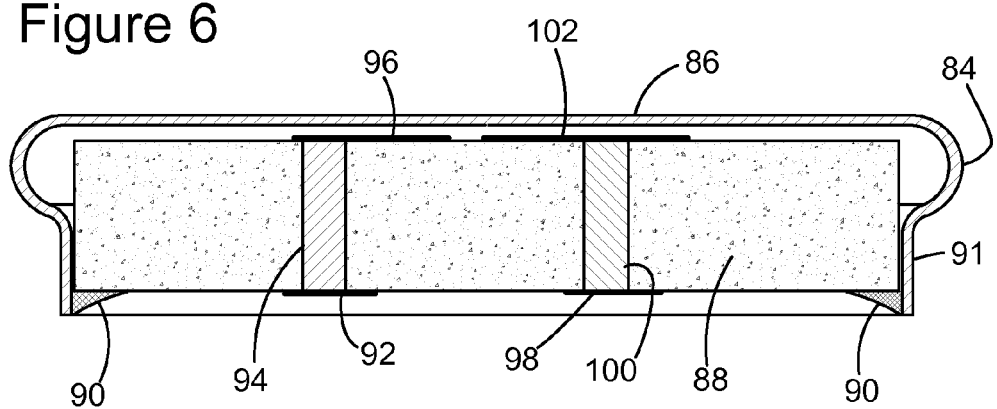
FIG. 6 is a schematic diagram of still another switch according to an exemplary embodiment.

The positioning of the seal plug 88 within the cap 82 determines the set point of the switch, because the vertical distance between the top surface 86 and the contacts 96 and 102 determines the distance the top surface 86 needs to travel to make contact. The embodiment of FIG. 5 includes a set of downwardly projecting contact points 104 on the underside of the top surface 86. In one embodiment, there are three such contact points 104, to make contact with the contacts 96 and 102. Three contact points ensure balanced contact between the mating surfaces. The embodiment of FIG. 6 is constructed in a similar fashion, but without the contact points, i.e., the top surface 86 is entirely flat (smooth).

Analysis has shown that the optimum thickness of the top surface is about 0.15 mm, or about 0.006". The deflection (corresponding to gap H in FIGS. 2 and 3) for the structure illustrated in FIGS. 5 and 6 is about 0.38 mm, or about 0.015" to achieve desired switching pressure of 3.1 bar (45 psi), which corresponds to a depth of about 31 m. It is noted that the present regulations require that the hydrophone is made inactive at about 35 m. In order to not exceed this depth, the present embodiment uses a depth of 31 m for short-circuiting the hydrophone. However, other depths may be used depending the regulations of each country. The switch can easily withstand an overpressure condition of 25 bar (362 psi), without exceeding yield strength anywhere in the switch, i.e., the switch is designed such that over pressuring the device will not increase its operational range. The top surface in any of the embodiments discussed above may be made of Beryllium Copper Alloy, although metals may also be used to reduce costs.

Figure 7:
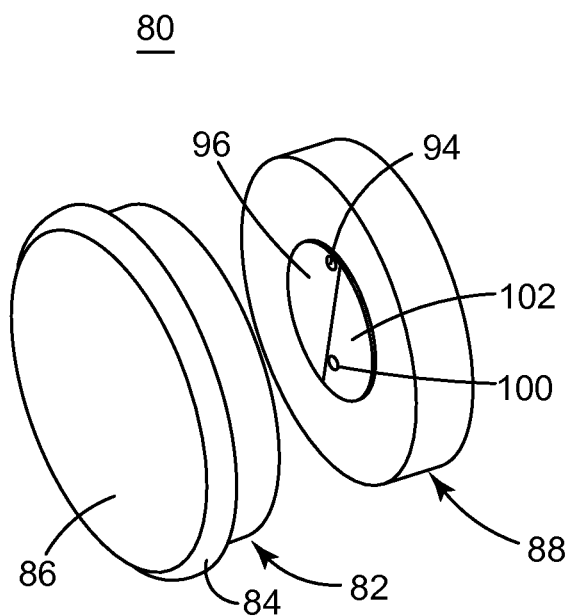
FIG. 7 is an overall view of the switches illustrated in FIG. 5 or 6 according to an exemplary embodiment.
Figure 8:
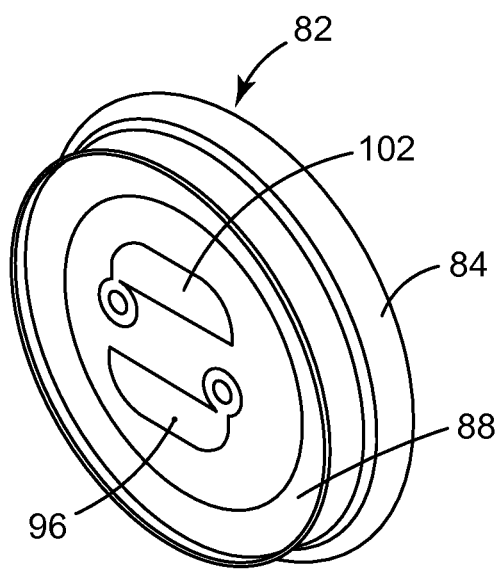
FIG. 8 is a back view of one of the switches illustrated in FIG. 5 or 6 according to an exemplary embodiment.
Figure 9:
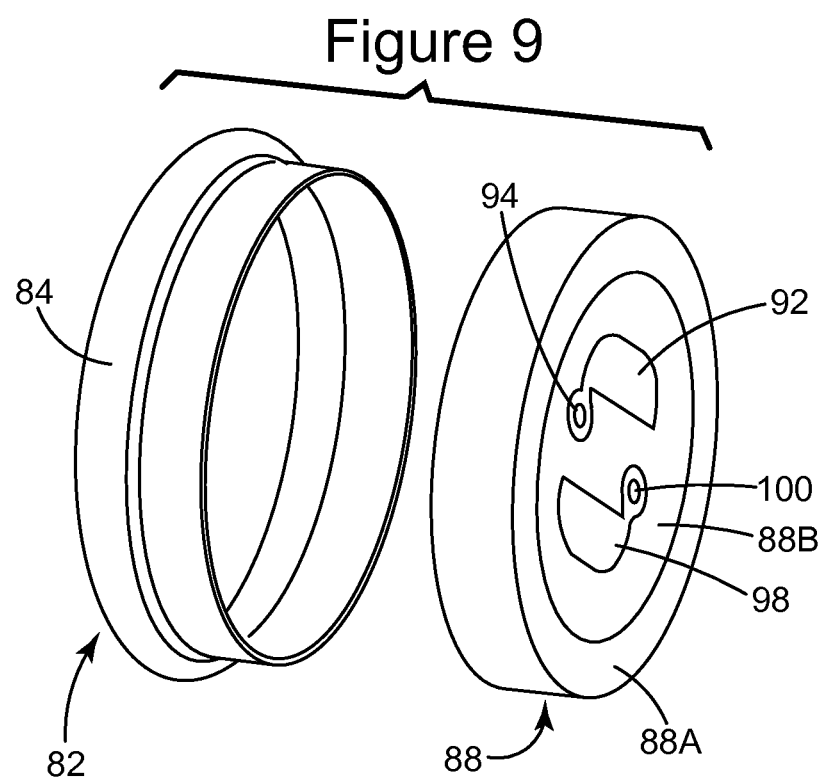
FIG. 9 is another overall view of one of the switches illustrated in FIG. 5 or 6 according to an exemplary embodiment.
Figure 10:
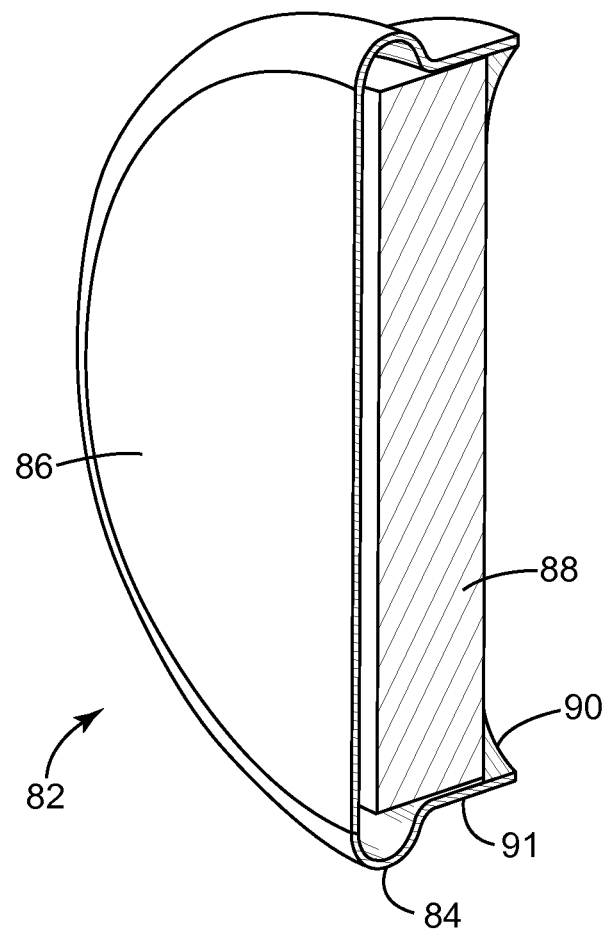
FIG. 10 is a cross-section of one of the switches illustrated in FIG. 5 or 6 according to an exemplary embodiment.

An overall view of the switch discussed above with regard to FIGS. 5 and 6 is shown in FIG. 7. The metal cap 82 is shown having the top surface 86 and the spring mechanism (bulge) 84. Note that this embodiment shows a single bulge 84. This has the advantage of easily being manufactured. The seal plug 88 is shown having two contacts 96 and 102 separated from each other and each communicating with corresponding jumpers 94 and 100, respectively. The shape of the contacts 96 and 102 is shown to be semi-circular in FIG. 7. However, other shapes may be used as shown in FIG. 8. FIG. 9 shows the inside of the metal cap 82 and the bottom surface of the seal plug 88, exposing the bottom input and output contacts 92 and 98. The seal plug 88 is shown made of two pieces 88A and 88B, e.g., one conductive and one non-conductive so that the signals to the output contacts 92 and 98 are separated from each other. FIG. 10 shows a cross-section view of the switch 80.

Figure 11:
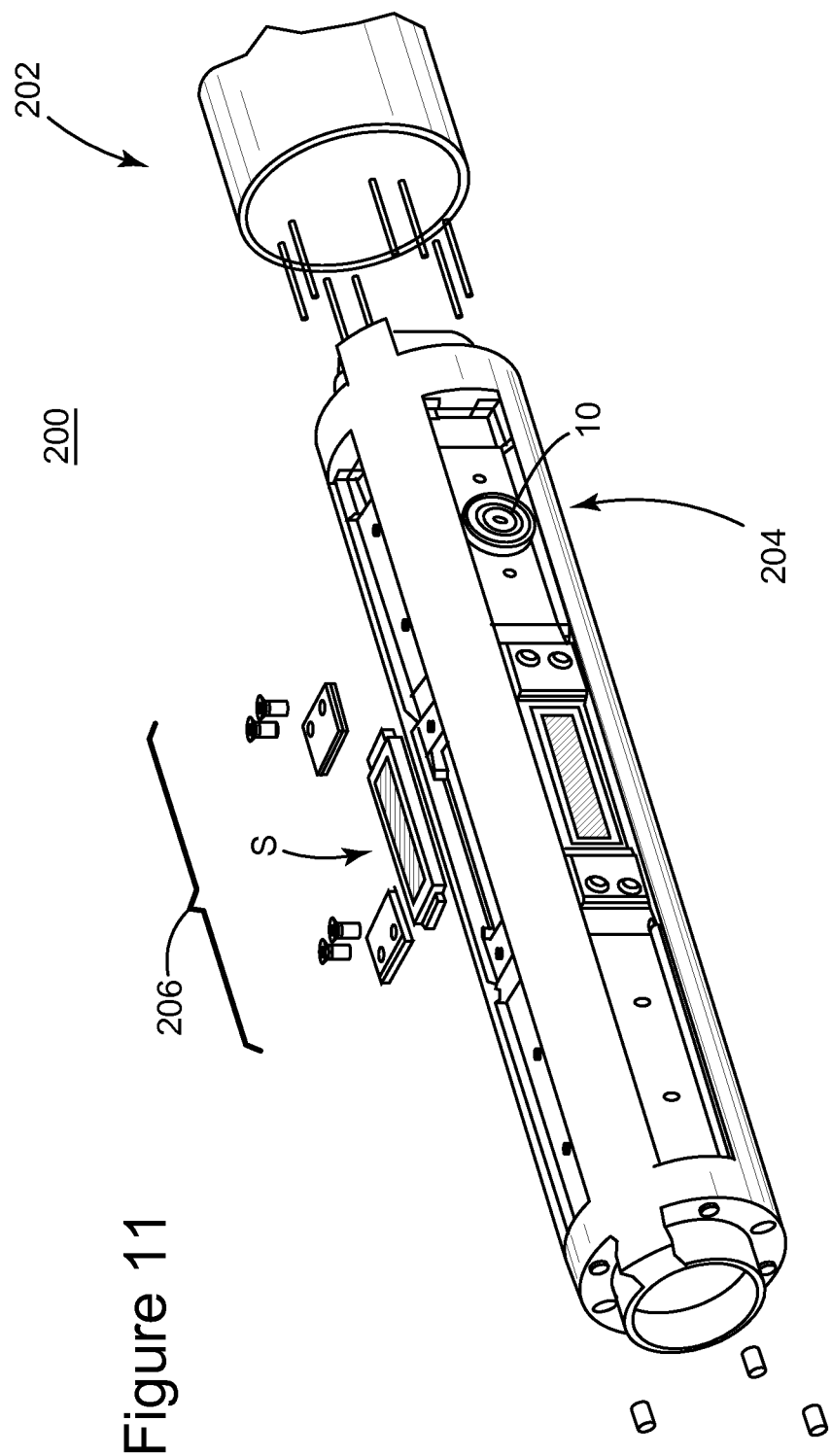
FIG. 11 is a schematic diagram of a sensor holder and the disposition of a switch relative to a seismic sensor according to an exemplary embodiment.

The switches discussed above may be internal to the hydrophone in a location so they cannot be easily defeated or removed. For example, FIG. 11 shows a hydrophone 200 that holds both elements S and the switch 10, for example, at a same location of the hydrophone carrier 206 inside the streamer. The hydrophone 200 illustrated in FIG. 11 has four components S. However, a hydrophone may have fewer or more components. Further, the switch may be implemented to control more than one sensor, e.g., a plurality of sensors. In one application, the switch is not provided next or in the same housing as the sensor. For example, the sensor may be provided at a first location along the streamer and the switch may be provided at a second location, different from the first location, along the streamer.

Figure 12:
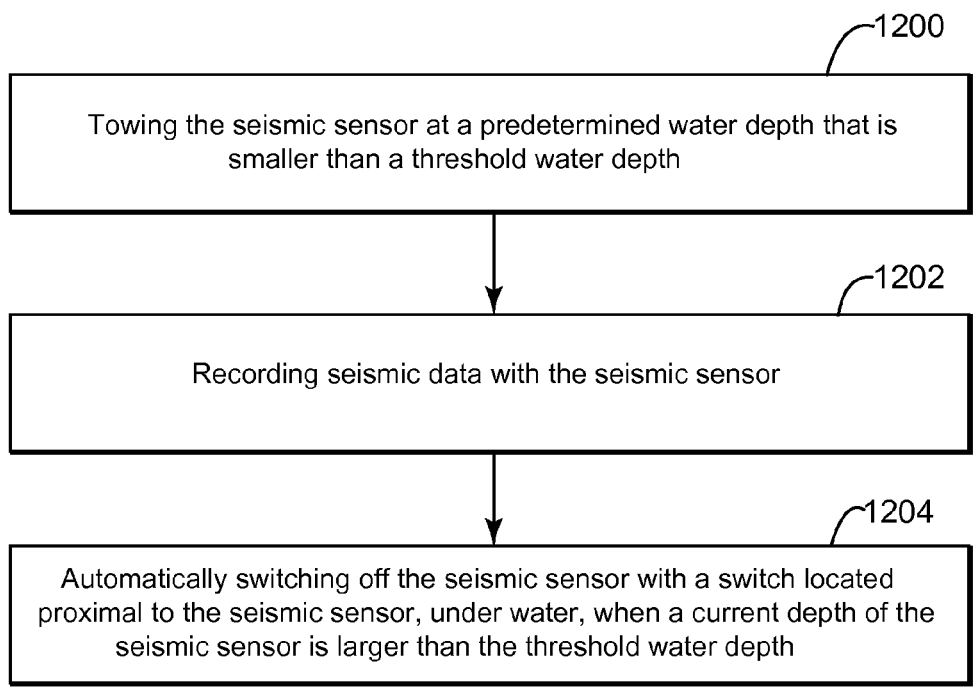
FIG. 12 is a flowchart of a method for switching a seismic sensor with a switch according to an exemplary embodiment.

A method for switching off a seismic sensor when reaching a desired depth may be implemented as discussed next. As illustrated in FIG. 12, the method includes a step 1200 of towing the seismic sensor at a predetermined water depth that is smaller than a threshold water depth, a step 1202 of recording seismic data with the seismic sensor, and a step 1204 of automatically switching off the seismic sensor with a switch located proximal to the seismic sensor, underwater, when a current depth of the seismic sensor is greater than the threshold water depth. The switch may be any of the switches discussed above.

The disclosed exemplary embodiments provide a switch and a method for switching off (shorting) a seismic sensor when a predetermined depth in a marine environment is reached. It should be understood that this description is not intended to limit the invention. On the contrary, the exemplary embodiments are intended to cover alternatives, modifications, and equivalents, which are included in the spirit and scope of the invention as defined by the appended claims. Further, in the detailed description of the exemplary embodiments, numerous specific details are set forth to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone, without the other features and elements of the embodiments, or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A switch for a marine seismic sensor, the switch comprising:
   a bellows having a closed end, a closed side portion and an open end, wherein the side portion connects the closed end to the open end, the closed end includes a conductive surface, and the side portion acts as a spring;
   a base plug that includes first input and first output contacts on a first side and second input and second output contacts on an opposite side, wherein the first input contact is electrically connected to the second input contact through a first jumper and the first output contact is electrically connected to the second output contact through a second jumper; and
   a plug located in the open end of the bellows and configured to form a chamber inside which the second input contact and the second output contact are located, wherein the chamber is formed by the bellows and the base plug,
   wherein the conductive surface short-circuits the second input contact and the second output contact when a pressure larger than a predetermined pressure (P) acts on the conductive surface.

2. The switch of claim 1, wherein the side portion of the bellows is undulated.

3. The switch of claim 1, wherein the side portion of the bellows faces a side portion of the base plug on which there are no electrical contacts.

4. The switch of claim 1, wherein the side portion of the bellows cannot contact the second input and output contacts.

5. The switch of claim 1, wherein the conductive surface is entirely flat.

6. The switch of claim 1, wherein a gap H between the conductive surface and the second side of the base plug is calculated based on a spring constant of the side portion so that when the predetermined pressure (P) acts on the conductive surface, the gap H is zero.

7. The switch of claim 1, further comprising:
   an input signal lead electrically connected to the first input contact; and
   an output signal lead electrically connected to the first output contact,
   wherein the input signal lead and the output signal lead are connected to a seismic sensor.

8. The switch of claim 1, further comprising:
   a sealant covering a portion of the base plug and the bellows for sealing the chamber.

9. A switch for a marine seismic sensor, the switch comprising:
   a bellows having a first open end, a side portion and a second open end, wherein the side portion connects the first open end to the second open end, and the side portion acts as a spring;
   a base plug located in the second open end and includes first input and first output contacts on a first side and second input and second output contacts on an opposite second side, wherein the first input contact is electrically connected to the second input contact through a first jumper and the first output contact is electrically connected to the second output contact through a second jumper;
   an end plug located in the first open end of the bellows and configured to include an electrode facing the second input contact and the second output contact; and
   a plug located in the open end of the bellows and configured to form a chamber with the bellows and the base plug, and the second input contact and the second output contact are located inside the chamber,
   wherein the electrode short-circuits the second input contact and the second output contact when a pressure larger than a predetermined pressure (P) acts on the end plug.

10. The switch of claim 9, wherein the side portion of the bellows is undulated.

11. The switch of claim 9, wherein the side portion of the bellows faces a side portion of the base plug on which there are no electrical contacts.

12. The switch of claim 9, wherein the side portion of the bellows cannot contact the second input and output contacts.

13. The switch of claim 9, wherein a gap H between the electrode and the second side of the base plug is calculated based on a spring constant of the side portion of the bellows so that when the predetermined pressure (P) acts on the conductive surface, the gap H is zero.

14. The switch of claim 9, further comprising:
   an input signal lead electrically connected to the first input contact; and
   an output signal lead electrically connected to the first output contact,
   wherein the input signal lead and the output signal lead are connected to a seismic sensor.

15. A switch for a marine seismic sensor, the switch comprising:
   a metal cap having a spring region connecting a top surface to a body having an opening, wherein the spring region has a diameter larger than a diameter of the body; and
   a plug located inside the metal cap to close the opening and configured to host plural contacts,
   wherein when a pressure is applied on the top surface, the spring region deforms to allow the top surface to move towards the plug; and
   when a predetermined pressure (P) is applied on the top surface, the spring region deforms to allow the top surface to contact two of the plural contacts.

16. The switch of claim 15, wherein a corresponding seismic sensor is shorted when two of the plural contacts are contacted by the top surface.

17. The switch of claim 15, wherein the plural contacts include first input and output contacts, second input and output contacts and jumpers that connect the first input contact to the second input contact and the first output contact to the second output contact.

18. The switch of claim 15, wherein a side portion of the plug faces both the body and the spring region.

19. The switch of claim 15, wherein the spring region is a single hump.

20. The switch of claim 19, wherein the metal cap is cylindrical and the single hump extends all around the metal cap.

21. The switch of claim 15, further comprising:
   a sealant configured to hermetically insulate a chamber formed between the metal cap and the seal plug.

22. The switch of claim 15, wherein the top surface is entirely flat.

23. The switch of claim 15, wherein a center gap H between the top surface and the second side of the seal plug is calculated based on a spring constant of the spring region so that when the predetermined pressure (P) acts on the top surface, the gap H is zero.

24. The switch of claim 15, further comprising:
an input signal lead electrically connected to the first input contact; and
an output signal lead electrically connected to the first output contact,
wherein the input signal lead and the output signal lead are connected to a seismic sensor.

25. A method for switching off a seismic sensor during a marine seismic survey, the method comprising:
towing the seismic sensor at a predetermined water depth that is smaller than a threshold water depth;
recording seismic data with the seismic sensor; and
automatically switching off the seismic sensor with a switch located proximal to the seismic sensor, under water, when a current depth of the seismic sensor is larger than the threshold water depth,
wherein the switch has a bellows and a conductive portion and the conductive portion is calibrated to touch two contact pads to switch off the seismic sensor when water pressure acts on the bellow at a depth larger than the threshold water depth.

* * * * *